UNITED STATES PATENT OFFICE.

ADOLF ISRAEL AND RICHARD KOTHE, OF ELBERFELD, GERMANY, ASSIGNORS TO FARBENFABRIKEN OF ELBERFELD CO., OF NEW YORK, N. Y.

AZO DYE.

SPECIFICATION forming part of Letters Patent No. 675,632, dated June 4, 1901.

Application filed December 31, 1900. Serial No. 41,627. (Specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in New Azo Dyes; and we hereby declare the following to be a clear and exact description of our invention.

In the two applications for Letters Patent filed December 31, 1900, and bearing the Serial Nos. 41,628 and 41,629, we have described the production of new urea and thio-urea compounds having the formula:

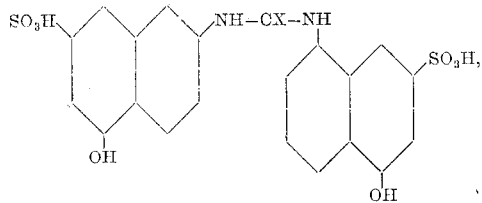

(in which formula X means an atom of oxygen, which may be replaced by an atom of sulfur.)

Our present invention relates to the production of valuable new azo coloring-matters by causing two molecules of the same or of different diazo compounds to act on the said urea or thio-urea compound.

We point out specifically that by the term "diazo compound" in the following specification we intend to denote a simple diazo compound as well as a diazotized amidoazo compound, such as diazoazobenzene, diazoazotoluene, or the like.

The new dyestuffs are alkaline salts of acids having most probably the following general formula:

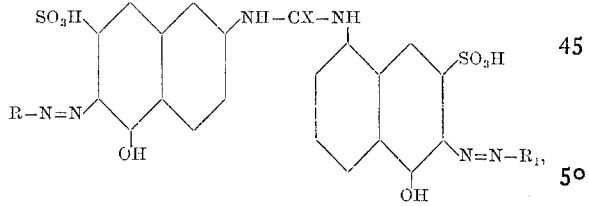

(in which formula X means an atom of oxygen, which may be replaced by an atom of sulfur, the groups $-N=N-R$ and $-N=N-R_1$ meaning either the same or two different radicals of "diazo compounds"—such as diazobenzene, diazotoluene, diazoazobenzene, diazoazonaphthalene, or the like—and which are from reddish-brown to dark-brown powders having a metallic luster, dissolving in water with from orange to bluish-red color. They dye unmordanted cotton from orange to bluish-red shades, which are of a remarkable fastness to light.)

In carrying out our new process practically we can proceed as follows, the parts being by weight: 15.3 parts of para-toluidin are diazotized in the usual manner with the aid of fifty-six parts of hydrochloric acid (of 15° Baumé) and ten parts of sodium nitrite. The resulting diazo solution is then slowly stirred into a solution prepared from 39.2 parts of the sodium salt of carbonyldioxydinaphthylamindisulfonic acid, which is the scientific name of one of the above-mentioned urea compounds, (prepared from $beta_1$-amido-$alpha_3$-naphthol-$beta_4$-mono-sulfonic acid and $alpha_1$-amido-$alpha_3$-naphthol-$beta_4$-sulfonic acid,) and thirty parts of sodium carbonate, ($Na_2 CO_3$.) After having stirred for several hours the formation of the dyestuff has been finished. The latter is separated from the mixture by the addition of common salt and isolated by filtration. The new coloring-matter thus obtained is the sodium salt of an acid having most probably the formula:

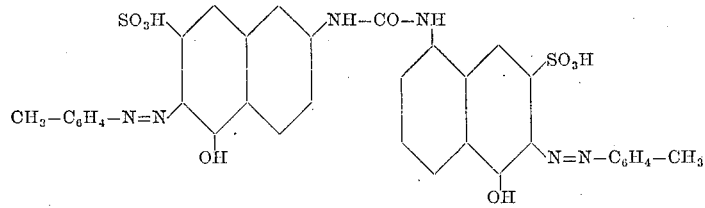

and is a reddish-brown powder having a metallic luster soluble in water with a red color. It is scarcely soluble in concentrated hydrochloric acid, while it is dissolved by concentrated sulfuric acid (of 66° Baumé) with a red color, which is changed into bluish red on the addition of a small quantity of ice, while on the addition of a larger quantity of ice a reddish-blue precipitate is obtained.

The new coloring-matter dyes unmordanted cotton red shades, which are fast to acids and to light.

The process proceeds in an analogous manner if instead of two molecules of diazotized paratoluidin other diazotized compounds are employed. If two different diazo compounds are employed, the first component is combined with the urea derivative in a slightly-acid and the second in an alkaline solution. On using, for instance, two molecules of diazotized beta-naphthylamin a bluish-red dyestuff is obtained. On using one molecule of diazotized anilin and one molecule of diazotized acetyl-para-phenylene-diamin also a bluish-red dyestuff is produced.

Having now described our invention and in what manner the same is to be performed, what we claim as new, and desire to secure by Letters Patent, is—

1. The herein-described new azo dyestuffs which are alkaline salts of acids having most probably the general formula:

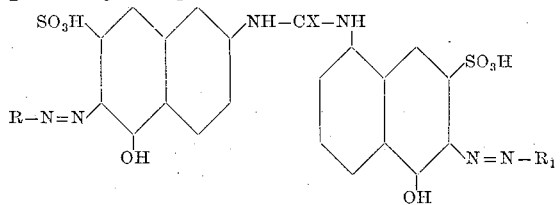

X meaning in this formula an atom of oxygen which may be replaced by an atom of sulfur, the groups $-N=N-R$ and $-N=N-R_1$ meaning the radicals of "diazo compounds," and which are from reddish-brown to dark-brown powders having a metallic luster, soluble in water with from an orange to bluish-red color, dyeing unmordanted cotton from orange to bluish-red shades, which are fast to light, substantially as hereinbefore described.

2. The herein-described new disazo dyestuff being an alkaline salt of an acid, having most probably the formula:

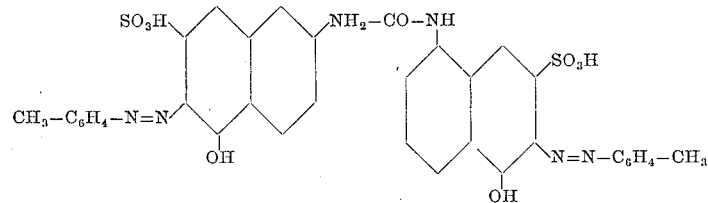

which in the form of its sodium salt is a reddish-brown powder having a metallic luster, soluble in water with a red color; scarcely soluble in concentrated hydrochloric acid; being dissolved by concentrated sulfuric acid (of 66° Baumé) with a red color which is changed into bluish red on the addition of a small quantity of ice, while on the addition of a larger quantity of ice a reddish-blue precipitate is obtained, dyeing unmordanted cotton red shades which are fast to acids and to light, substantially as hereinbefore described.

In testimony whereof we have signed our names in the presence of two subscribing witnesses.

ADOLF ISRAEL.
RICHARD KOTHE.

Witnesses:
 OTTO KÖNIG,
 J. A. RITTERSHAUS.

It is hereby certified that in Letters Patent No. 675,632, granted June 4, 1901, upon the application of Adolf Israel and Richard Kothe, of Elberfeld, Germany, for an improvement in "Azo Dyes," an error appears in the printed specification requiring correction as follows: On page 2, the formula following line 54,

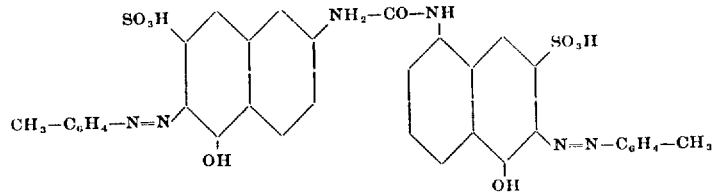

should read

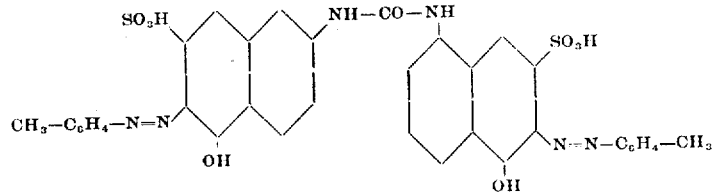

and that the said Letters Patent should be read with this correction therein that the same may conform to the record of the case in the Patent Office.

Signed, countersigned, and sealed this 13th day of August, A. D., 1901.

[SEAL.]

F. L. CAMPBELL.
*Assistant Secretary of the Interior.*

Countersigned:
    E. B. MOORE,
        *Acting Commissioner of Patents.*